United States Patent Office

2,981,396
Patented Apr. 25, 1961

2,981,396

FEED DEVICE FOR RECORD CONTROLLED ADDRESSING MACHINES AND LIKE MACHINES

Henry R. A. Lane, Codsall, England, assignor to Graphic Technology Limited, Bilston, England, a British company Filed May 8, 1959, Ser. No. 811,951

6 Claims. (Cl. 197—133)

This invention relates to a feed device for addressing machines, tabulating machines, computors, typewriters or the like machines which are of the type hereinafter defined. For the purpose of simplicity of terminology, all such machines of this type are herein included under the generic term "addressing machine."

The type of machine with which the invention is concerned is that which can be adapted to print one class of data or different classes of data upon paper which is fed through the machine in continuous lengths, the printing operations being controlled either manually or by a record medium, such as a series of record cards, plates or like devices which pass a sensing device in the machine whereby the passage of, or certain formations on, the record cards or the like govern the printing mechanism to print the data or particular class of data, if selected, in the appropriate place upon the paper. Under manual control, the operator, upon observing a particular card, plate or the like, will operate the controls to produce the required printing operation. The paper may be the continuous stationery type which is subsequently split into separate form lengths.

An example which illustrates one of the uses of these machines is the printing of data which is in two classes, one class being a heading ("head") class and the other class being a listing ("list") class, so that, for example, using continuous stationary, a form length of paper would have a heading printed in one position followed by a number of listings printed in succession below the heading.

The primary object of the present invention is to provide a device which will enable the operation of printing to be carried out automatically in accordance with any selected programme for the data.

In the following more detailed description of one form of the invention it will be appreciated that the invention is not limited to the use of the specific apparatus mentioned as various "electrical" equivalents may be used in place of the various elements of the combination.

One practical form of the invention, which is now described by way of example, is illustrated in the accompanying drawings wherein.

The automatic control device described hereinafter is constructed as an attachment for an existing addressing machine which is required to print two classes of data on continuous sheets of stationery, such classes being "head" data and "list" data. For example, the heads may be the names of insurance agents and the lists may be the names and addresses of people from whom preminums are due in a particular period and the records in this case will be the actual printing plates which are to be fed in the usual way from a magazine into the printing station where the moving printing platen of the machine causes the data on the record plate to be printed on the sheet in well-known manner.

The construction and operation of the addressing machine will be well-known to those skilled in the art of such machines and is not therefore described herein, as the actual details of such machines do not form part of the present invention.

The record plates may have the usual projecting tabs or other formations which, in known manner, cause the sensing head of the machine to control the platen in its operating movement.

Figure 4:
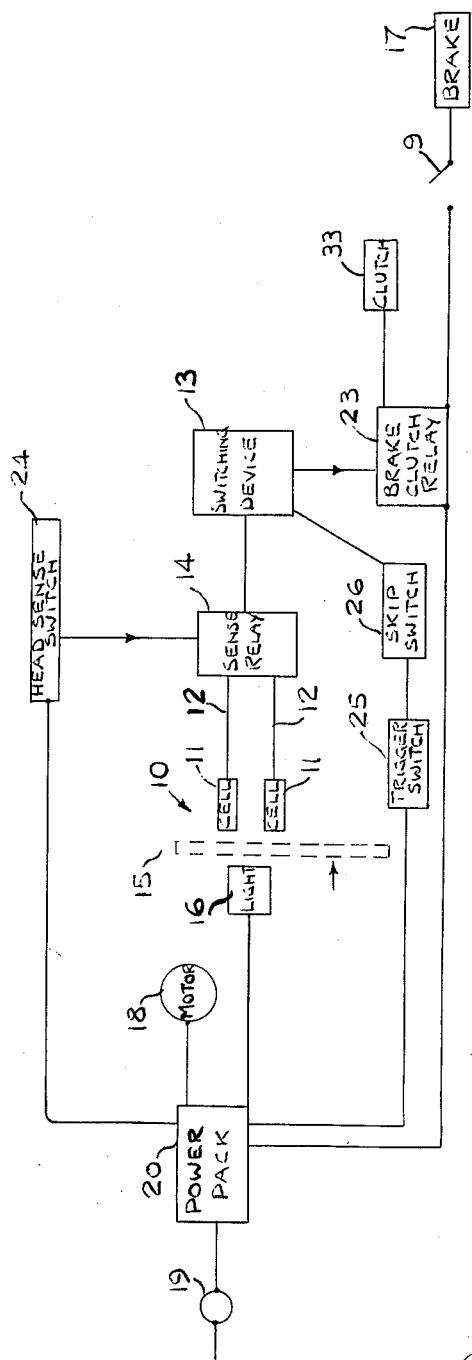
Figure 4 is a block circuit diagram of the electrical and electronic parts of the automatic control device.

Reference is first made to Figure 4 which shows in block diagram form the layout of the parts and circuits for the automatic control device forming the invention. It is not thought necessary to give detailed explanations of circuit diagrams as these are standard forms and well within the capacity of the skilled electrical engineer.

The detector indicated generally at 10 comprises a photo-electric cell assembly having two light-sensitive elements 11 in parallel circuits 12 which are electrically connected to the switching device 13 through the intermediary of the sense relay 14 which is referred to later, and the programme control member is in the form of a a disc 15 of transparent material upon which certain opaque marks are made and these marks constitute the programme selection means when the disc is set up to rotate in a plane which cuts across the path of light between the source of illumination (a lamp 16) and the light sensitive elements 11 in the photo-electric cell assembly.

The programme disc is mounted for rotation in this fashion and is driven through suitable gearing (as described later) from a main paper feed shaft which carries feeding means for positively feeding the continuous sheet of paper through the printing position. In the case of marginal perforated sheets this feed shaft has a pair of pin wheels mounted thereon for engaging the marginal perforations and it is also provided with a solenoid operated clutch 33 and a solenoid operated brake 17, the former being for the purpose of connecting the shaft to a continuously operated driving motor 18 when the paper is to be fed forward.

The electrical supply for operation of the control is taken from a suitable source such as the mains supply through a main "on-off" switch 19 (Figure 4) to a power pack 20 which supplies the required operating voltages to the various parts of the control.

An example of a typical programme for an addressing machine may be one head followed by a number of lists (say five) and hence the programme disc 15 (see Figure 2) can have the five list marks 21 arranged radially in angularly spaced relationship and at a common distance from the centre of the disc with the head mark 22 also radially disposed but at a different distance from the centre and lying in the angle between two adjacent list marks. To co-operate with this disc the two light-sensitive elements 11 of the photo-cell assembly are spaced apart by a distance to correspond to the radial difference between the head mark 22 and the list marks 21 (as will be seen from Figure 2).

If it is required to use a paper having different form lengths from one previously used this can be accommodated by a suitable change in the gearing between the main paper feed shaft and the programme disc as referred to later.

The circuits 12 from the detector head are electrically connected to the switching device 13 through the intermediary of the sense relay 14 which determines which of the two circuits 12 is at any particular time directly connected to the switching device 13. The switching device 13 is preferably an electronic type because of its gerater speed of operation and durability as compared with an equivalent electromagnetic device. This switching device may be a bi-stable trigger circuit (sometimes called a "flip-flop") or a thyratron or cold cathode trigger tube or any of the known equivalents, and it is arranged so as to operate a relay 23 which controls the power supply to the solenoids of the clutch 33 and brake 17. Thus when the detector 10 detects either a list or head mark on the programme disc 15 a pulse is sent through one or the other of circuits 12 to the switching device 13 which thereupon operates the relay 23 to release the clutch 33, apply the brake 17 and bring the paper to rest in the correct position.

The means which is operable by the passage of the record plates from the magazine into the addressing machine comprises a switch 24 (head sense switch) working in combination with the sense relay 14, and this switch 24 is operatively connected with a known sensing device of the addressing machine and in the preferred arrangement described here this switch 24 is arranged so that it is actuated to operate the sense relay 14 when, but only when a head record plate has been sensed by the machine and is about to be printed by the machine.

In machines incorporating an electrically operated sensing head the switch 24 may be eliminated and the relay 14 may be operated by the sensing pulses produced by the sensing head.

The sense relay 14 is of well-known form and has two working positions; in one position it connects one circuit 12 to the switching device 13 and in the other position it connects the other circuit 12 to the switching device 13. In normal working position the relay setting is such that it connects the switching device 13 to the circuit 12 of the photo-cell which registers with the list marks 21 on the programme disc 15 so that normally the detector is working on the listing sense. When the head sense switch 24 is operated as a consequence of the passage of a heading record plate through the sensing head of the addressing machine then power is supplied to the sense relay to move it to its other working position and thus connect switching device 13 to the other cell 11 of the detector and thus place the detector on a heading sense.

The paper feed is restarted by means of the trigger switch 25 which is automatically-operated once per cycle of the addressing machine to send an impulse to the switching device 13 to cause it to actuate the brake clutch relay 23 in the reverse direction thus energising the clutch solenoid to restart the drive and de-energising the brake solenoid to release the brake.

It will be appreciated that instead of having one sense relay 14 which is only operated after a heading plate is sensed in the addressing machine, it would be possible to have two separate relays, one to be operated after a list plate is sensed and one to be operated after a heading plate is sensed but owing to the fact that there will generally be far more list operations than head operations, the list relay might be liable to wear owing to very frequent operation, so it is preferred to arrange the circuits so that everything is normally set on the listing sense and the one relay 14 serves to change the setting over from listing to the heading sense.

With a dual-channel device, doing automatic dual-channel work, paper feed would be initiated once per machine cycle (as by the trigger switch 25 in the aforementioned example) and this gives rise to a possible point of complication due to the fact that the magazine of the machine, when set up for a particular "run," may contain a number of record plates which will pass through the machine without causing any printing to take place. For such particular "run" of the machine, these record plates, which do not print, are termed "skip" plates and this term is used hereinafter to refer to these plates and distinguish them from the other plates which do print (head or list) for that one particular run of the machine.

The record plates are generally sensed (by the sensing device of the machine) several machine cycles before they come up for printing (or non-printing) and the recorded senses are stored in a "memory" device to be fed out at an appropriate later machine cycle when the relevant plate reaches the print, or preprint, position. When the machine is being set up for a particular "run," the sensing device will be set so that it will call a printing action for a certain selected combination of projecting tab or pip or other sensing media incorporated in the plates and those plates which do not have this combination are the skip plates for this particular run because the passage of such skip plate through the sensing device will means that the sensing device will not store any printing sense and hence there will be an absence of any print sense at all in the "memory" device for each skip plate.

When the machine is set up on another run with a different selection, programme plates which were skip plates in the previous run may now become printing plates depending upon the required setting of the sensing device whilst plates which were previously printing plates may now become skip plates. It should be appreciated therefore that where reference is made herein to a skip plate it means a record plate which is acting as a skip plate for a particular run of the machine. Now, owing to the presence of these skip plates and with a trigger switch 25 which is operated once per machine cycle it could come about that a form length or a printing space on a sheet could go through the machine without being printed upon and would thus be wasted.

Also, when the machine is first started up on a run, several machine cycles will be needed to bring the first plate to the print position and for each of these cycles there is an absence of a print sense, so that the platen does not operate and the paper should not feed otherwise some of the paper at the beginning of the run will be wasted. Again at the end of a run when the magazine is exhausted the machine will continue for several cycles after the last plate has passed the printing position and gone into a collecting device and the paper should not feed during this period. Hence for these three cases (presence of skip plate, beginning and end of run) there is absence of any print sense for the sensing device. For simplicity of terminology this condition is referred to hereinafter and in the appended claims as being the "non-print condition" and is brought about by the presence of a skip plate, or the absence of any plate, at the sensing position during an appropriately earlier machine cycle.

This possible waste of a form or printing space is avoided in this way: the non-print condition of the sensing device is caused to render the trigger switch 25 inoperative at the point in the sequence of operation of the machine when the trigger switch would normally have operated to initiate the paper feed. Thus when a skip plate is sensed the trigger switch will be rendered inoperative at the appropriate later stage and no paper feed will occur when the platen does not print. Also, when the machine is started up, the trigger switch will be held inoperative until the first printing plate comes into position and the plate performs a printing operation because prior to that the non-print condition has existed from the sensing device. At the end of a run the trigger switch will be held inoperative after the last plate has left the printing position, because the absence of any further plates has brought about the non-print condition from the sensing device.

In the working mechanism of this type of addressing machine there is a main shaft carrying clutches for operating various functions of the machine and being rotated once per operative cycle of the machine. The trigger switch 25 can therefore be operated by a cam mounted on this main shaft and the means for putting the trigger switch out of operation at the appropriate point, may be mechanical or electrical. For example, there could be a mechanism which constitutes a trap and holds the trigger switch at the appropriate time so as to prevent it from being operated by the cam. A simpler arrangement is that shown in Figure 4 in which skip switch 26 is placed in series with trigger switch 25 and is normally closed to complete the circuit but is arranged so that it is opened at the appropriate point, thus putting the trigger switch out of action temporarily.

Operation of the device is as follows: as the sense relay 14 is normally on the list circuit of the detector 10, so long as list plates are being sensed in the addressing machine there will be no operation of the head sense switch 24, and the detector will remain on the listing sense. Each time a list mark 21 on the programme disc 15 registers with the appropriate detector cell 11 a pulse is sent to the switching device 13 which operates the brake clutch relay 23 and the feed stops, for printing in a list position to take place, after which the trigger switch 25 (unless rendered inoperative by a non-print condition of the sensing device) is operated to give another pulse to the switching device 13 to restart the drive until the next mark on the programme disc causes a halt. After a heading plate has been sensed the switch 24 operates the sense relay which is maintained by a subsidiary circuit, to change the detector 10 to the head sense circuit by connecting the switching device 13 to the head circuit of the detector 10; when the heading mark 22 on the programme disc registers with the appropriate detector cell 11 the paper feed is stopped for the heading to be printed and is then restarted by the operation of the trigger cam only before a printing sense plate for "head or list" reaches the printing position.

A manually operable switch 9 is provided in the circuit to the brake solenoid to allow the brake to be released when power is on the device for the purpose of making setting adjustments to the paper feed shaft. This switch 9 is normally in the closed position.

Figure 1:
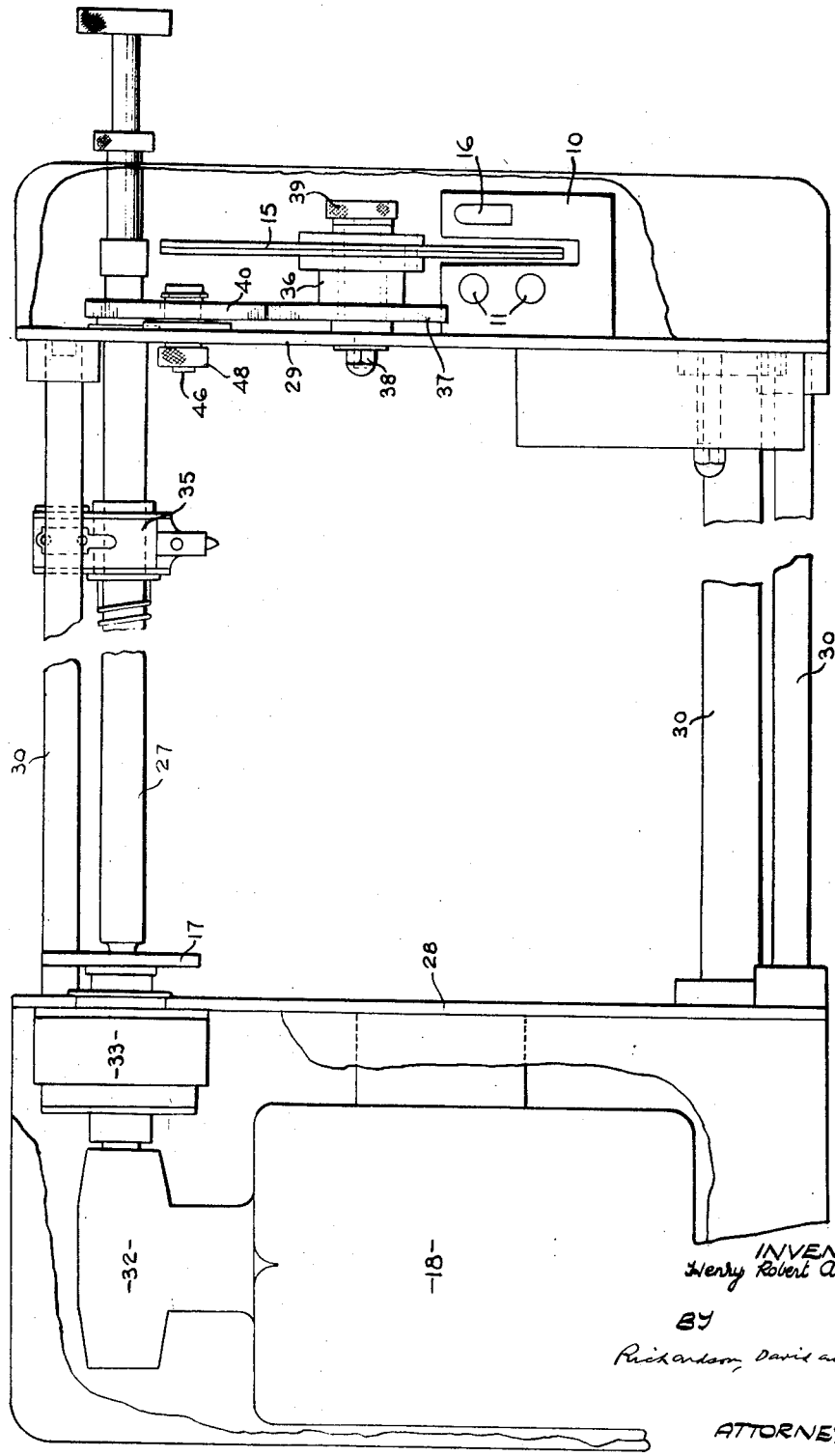
Figure 1 is a front elevation of an attachment for an addressing machine, said attachment being made as an automatic control device which can be installed on an existing addressing machine and the view here is that which would be seen from the back of the addressing machine where the printed sheet is delivered from the machine.
Figure 2:
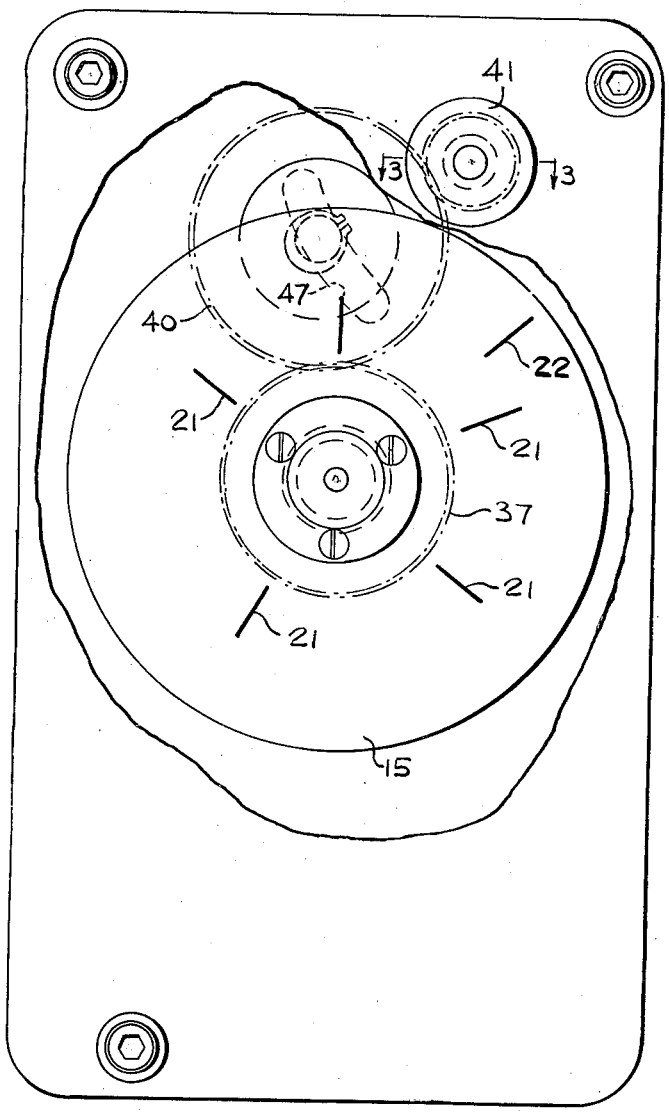
Figure 2 is an end view looking from the right in Figure 1, certain parts being omitted for clarity.
Figure 3:
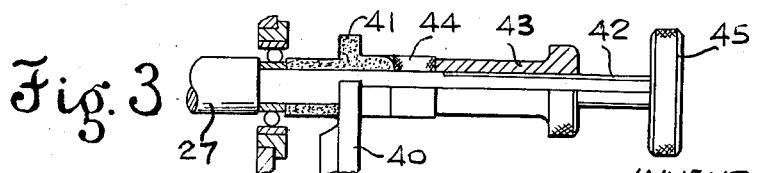
Figure 3 is a section on line 3—3 in Figure 2.

As shown in Figures 1, 2, 3 the automatic control device is incorporated in an attachment which may be rapidly fitted to an existing addressing machine with the minimum of modification.

The paper feed drive shaft 27 is mounted between a pair of spaced side plates 28, 29 which are connected together by suitable tie bars 30. The left hand side plate 28 carries the driving motor 18 and gearing 32 which transmits the drive to shaft 27 through the solenoid operated clutch 33. Mounted on shaft 27 is the solenoid operated brake 17.

Also mounted on shaft 27 are the two spaced pin wheels of known form; only one of which is shown (at 35) in Figure 1.

The programme disc 15 and its gearing, and the detector 10 are mounted on the outer face of the other side plate 29 and the remaining electrical parts (i.e. switching device 13, sense relay 14, brake-clutch relay 23, and power pack 20) can also be mounted on one of the side plates or housed in a separate case. The manual switch 9 for operating the brake solenoid for setting-up purposes may also be attached to one of the side plates. The head sense switch 24, skip switch 26 and trigger switch 25 are actuated by appropriate mechanisms within the addressing machine.

The programme disc 15 is detachably connected to a sleeve 36 which is fixed to gear wheel 37 mounted upon a spindle 38 which is fixed in the side plate 29 and the programme disc is held in place by the knurled nut 39. By removal of the nut 39 one programme disc may be removed and be replaced by another disc having a different programme thereon.

The gear wheel 37 is driven by idler gear 40 which is in mesh with the driving gear 41 mounted about the paper feed shaft 27. As shown in Figure 3 the shaft 27 has an extension which is externally threaded at 42 and has mounted thereon an internally threaded sleeve nut 43. The gear 41 is free upon the extension of shaft 27 but is normally clutched thereto frictionally by screwing up the sleeve nut 43 to press the clutch sleeve 44 against gear 41. By slackening the sleeve nut 43 the gear 41 is de-clutched from shaft 27 and manual setting up of the shaft can be performed by turning the knob 45.

Idler gear 40 is mounted about a spindle 46 which works in an arcuate slot 47 cut in the side plate 29 and is normally locked by a nut 48 in the position in which the idler gear is in mesh with gear 37. By loosening nut 48, the idler gear 40 can be swung out of mesh to allow the gear 37 to be removed and replaced by a different sized gear when it is desired to change the length of form on the sheets which are being printed upon. Change of the gear 37 alters the speed of rotation of the programme disc 15 in accordance with the length of form which is being dealt with.

What I claim then is:

1. A control device for an addressing machine of the type specified comprising a pair of spaced apart parallel side plates, a main paper feed shaft supported in and extending between said side plates, a driving motor for said shaft mounted on one of said side plates, a solenoid-operated clutch on said shaft for coupling same to said motor, a solenoid-operated brake on said shaft, a photo-electric cell detector head having two light-sensitive cells, a source of illumination operatively associated with said detector head, a programme control member having transparent parts and opaque parts arranged to constitute a set of programme selection means for head data and list data, gearing between said shaft and said programme control member for moving same in synchronism with the feed of paper through the machine in a path which passes between said source of illumination and said light-sensitive cells, said detector head, programme control member and gearing being mounted on the other of said side plates, an electronic switching device, independent channels electrically connecting said switching device to each of said light-sensitive cells, an electrical relay connected between said switching device and said clutch and brake, said relay functioning, when the switching device is operated, to disengage the clutch and apply the brake, means operable by the passage of record devices through the machine to render operative the appropriate channel according to the particular data classification of a record device, so that such channel is in condition to be operated by the next following one of the set of programme selection means of the corresponding data classification, each one of the set of programme selection means being operable, when passing between the source of illumination and the detector head, to initiate the operation of the switching device through the appropriate operative channel to halt the paper in the required position, and a trigger switch device operated in synchronism with the cycle of the machine to restart the paper feed after printing has taken place.

2. A control device according to claim 1 wherein the switching device comprises an electronic device of the bi-stable trigger type connected in a circuit between the detector head and the relay which controls the clutch and brake and also in a circuit between the trigger switch and said relay.

3. A control device according to claim 1 wherein the means operable by the passage of the record devices through the machine comprises an electrical head-sense switch which is actuated by virtue of the passage of a head record device through the sensing device of the machine and an electrical sense relay connected in circuit so that it is normally in the channel between the switching device and the light-sensitive cell which is associated with the list programme selection means on the programme control member, the operation of said head-sense switch causing the sense relay to change over so that it is then connected in circuit in the other channel.

4. A control device according to claim 1 including means to render said trigger switch device inoperative when a non-print condition exists from the sensing device of the addressing machine.

5. A control device according to claim 1 including means to render the trigger switch device inoperative comprising a skip switch connected electrically in series with the trigger switch and means operable to open said skip switch when a non-print condition exists from the sensing device of the addressing machine.

6. A control device according to claim 1 wherein the programme control member comprises a disc of transparent material having opaque marks spaced angularly around the centre thereof, the said gearing comprising a driving pinion fixed on said main paper feed shaft, a spindle mounted in one of said side plates, means for adjusting the position of the spindle transversely of its axis, an idler pinion mounted on said spindle, a further shaft mounted in said side plate, a second pinion rotatably mounted on said further shaft, said disc being connected detachably in driving engagement with said second pinion, said idler pinion normally being in mesh with said driving pinion and with said second pinion.

References Cited in the file of this patent
UNITED STATES PATENTS

| | | |
|---|---|---|
| 2,531,885 | Mills et al. | Nov. 28, 1950 |
| 2,747,717 | Cunningham | May 29, 1956 |
| 2,769,518 | Faulkner | Nov. 6, 1956 |